(12) United States Patent
Hong

(10) Patent No.: US 6,421,233 B1
(45) Date of Patent: Jul. 16, 2002

(54) POCKET PERSONAL COMPUTER WITH IMPROVED BATTERY COMPARTMENT ENCLOSING STRUCTURE

(75) Inventor: Mi-Rong Hong, Taipei (TW)

(73) Assignee: High Tech Computer Corporation, Taoyuan (TW)

( * ) Notice: Subject to any disclaimer, the term of this patent is extended or adjusted under 35 U.S.C. 154(b) by 30 days.

(21) Appl. No.: 09/592,121

(22) Filed: Jun. 12, 2000

(51) Int. Cl.[7] .............................. H05K 5/00; G06F 1/16
(52) U.S. Cl. ..................... 361/683; 361/679; 361/727; 429/96; 429/100; 429/99; 429/239; 371/440; 455/89; 455/90; D13/103; D13/118; D14/137
(58) Field of Search ................................ 361/683, 679, 361/724–727, 732, 814; 429/96–100, 149, 239; 379/440; 455/89, 90; D13/103, 118, 119; D14/137, 138, 217

(56) References Cited

U.S. PATENT DOCUMENTS

| 5,039,580 A | * | 8/1991 | Mori et al. ................... 429/97 |
| 5,180,891 A | * | 1/1993 | Trumbo ........................ 178/18 |
| 5,321,584 A | * | 6/1994 | Matheny ..................... 361/752 |
| 5,506,749 A | * | 4/1996 | Matsuda ..................... 361/683 |
| 5,630,664 A | * | 5/1997 | Farrelly ................. 128/695 R |
| 5,762,512 A | * | 6/1998 | Trant et al. ................. 439/347 |
| 5,861,873 A | * | 1/1999 | Kikinis ....................... 345/157 |
| 5,884,772 A | * | 3/1999 | Floyd et al. ................. 206/701 |
| 5,949,408 A | * | 9/1999 | Kang et al. ................. 345/169 |
| 6,101,087 A | * | 8/2000 | Sutton et al. ............... 361/686 |
| 6,177,950 B1 | * | 1/2001 | Robb .......................... 348/14 |

* cited by examiner

Primary Examiner—Darren Schuberg
Assistant Examiner—David Foster
(74) Attorney, Agent, or Firm—Dorsey & Whitney LLP

(57) ABSTRACT

A pocket personal computer having improved battery compartment enclosing structures is disclosed. The battery compartment enclosing structures include a battery compartment defined in a rear side of the pocket personal computer for accommodating a battery therein, a battery compartment cap for enclosing the battery compartment and an unlocking means form unlocking the cap. The battery compartment has two positioning openings defined in a rear side wall of the compartment and a bulge inwardly formed on an inner face of a front side wall and the bulge has a slanted upper face and a flat lower face. The cap has two protrusions formed at a rear end thereof which can be received in the openings as the cap is positioned over the compartment and a latch downwardly formed at the front end of the cap and the latch has a slanted lower end and a depressed neck portion to cooperate with the bulge to lock the cap in position. The unlocking means is a through hole defined in the front side wall of the compartment and is arranged such that a tip end of a pen may be inserted therethrough to break a locking engagement between the latch and the bulge.

9 Claims, 2 Drawing Sheets

POCKET PERSONAL COMPUTER WITH IMPROVED BATTERY COMPARTMENT ENCLOSING STRUCTURE

FIELD OF THE INVENTION

The present invention relates generally to a Pocket Personal Computer (PPC) and more particularly, to a PPC having improved battery compartment enclosing structures.

BACKGROUND OF THE INVENTION

A pocket personal computer (PPC) 1, as seen in FIG. 1, is a compact, hand-held electrical device which is powered by batteries. A PPC normally has, at a front face thereof, a display panel 3, four function buttons 5a–5d, a microphone 7, and an indication light 9. As seen in FIG. 2, the PPC 1 further has, at a rear face thereof, a slot 11 for containing a pen 13, a primary battery compartment 17 with a cap 19 for accommodating a battery (not shown) as a primary power source, and a secondary battery compartment 21 with a cap 23 for accommodating another battery (not shown) as an auxiliary power source.

Conventionally, there are guiding grooves 17a, 17b provided along lateral sides of the primary battery compartment 17 and there is a engaging recess 17c provided a front side of the primary battery compartment 17. The cap 19 has protrusions 19a, 19b (only 19b is shown) provided along its lateral sides and a latch tongue 19c provided at a front side thereof such that the cap 19 is capable of sliding over the primary battery compartment 17 with the protrusions 19a, 19b engaging with the grooves 17a, 17b and is retained in a closed position by means of an engagement between the engaging recess 17c and the latch tongue 19c so as to enclose the primary battery compartment 17. When the cap 19 needs to be removed, a force is applied in a direction indicated by arrow D to disengage the latch tongue 19c from the recess 17c. The secondary battery compartment 21 and the cap 23 have a structure similar to that of the primary battery compartment 17 and the cap 19.

This type of structure is suffering a drawback. That is, the cap may be accidentally opened while an external force is unintentionally applied to the cap in a the direction D and this will cause the battery dropping out from the battery compartment and as a result cause a power failure of the PPC.

SUMMARY OF THE INVENTION

One object of the present invention is to provide a reliable battery compartment enclosing structure which is capable of eliminating the drawback mentioned above.

According to one aspect of the present invention, in a pocket personal computer having a pen, a battery compartment and a battery compartment cap, the battery compartment is defined in a rear face of the pocket personal computer and has a first positioning means provided at a first side wall of the compartment, a first locking means provided at a second side wall of the compartment which is opposite to the first side wall, and an unlocking means provided at the second side wall; and the battery compartment cap has a second positioning means provided at a rear end thereof to removably engage with the first position means and a second locking means provided at a front end thereof to cooperate with the first locking means so as to lock the battery compartment cap in position to enclose the battery compartment, wherein the unlocking means can be operated by the pen to release the second locking means from the first locking means.

In one embodiment of the present application, the first positioning means comprises at least one openings and the second positioning means comprises at least one protrusions which can be received in the openings as the cap is positioned over the compartment. The first locking means comprises a bulge inwardly formed on an inner face of the second side wall which has a slanted upper face and a flat lower face. The second locking means comprises a latch downwardly formed at the front end of the cap and the latch has a slanted lower end and a depressed neck portion to cooperate with the bulge of the first locking means. The unlocking means comprises a through hole formed in the second side wall of the compartment. The through hole is arranged and sized such that a tip portion of the pen may extend therethrough to cause the second locking disengage from the first locking means.

According to another aspect of the present invention, in a pocket personal computer having a pen, a battery compartment and a battery compartment cap, the battery compartment is defined in a rear face of the pocket personal computer and has an axis formed at one side thereof; the battery compartment cap has a connecting means formed at a first end thereof for pivotally connecting to the axis and a first locking means formed at a second end thereof which is opposite to the first end; and a second locking means arranged at a position of the rear face of the pocket personal computer such that when the cap is pivoted to a position enclosing the compartment an engagement between the first and the second locking means can lock the cap in position and shaped such that the locking engagement may be disengaged by the pen.

In one embodiment of the present invention, the connecting means comprises a connecting arm in a form of a hook for pivotally connecting to the axis and the battery compartment cap thus can be rotated from an opened position to a closed position. The first locking means comprises a latch extending from a second end of the battery compartment cap. The latch has a peg vertically protruding upward from an upper face thereof and the peg has a rearward slanted upper face. The second locking means comprises a through hole defined in the rear face of the pocket personal computer which can receive the peg while the battery compartment cap is rotated to the closed position so as to lock the battery compartment cap in position and enclose the battery compartment.

BRIEF DESCRIPTION OF THE DRAWINGS

The present application is explained in more detail on the basis of the exemplary embodiments schematically illustrated in the figures, in which.

DETAILED DESCRIPTION OF THE INVENTION

Figure 1:
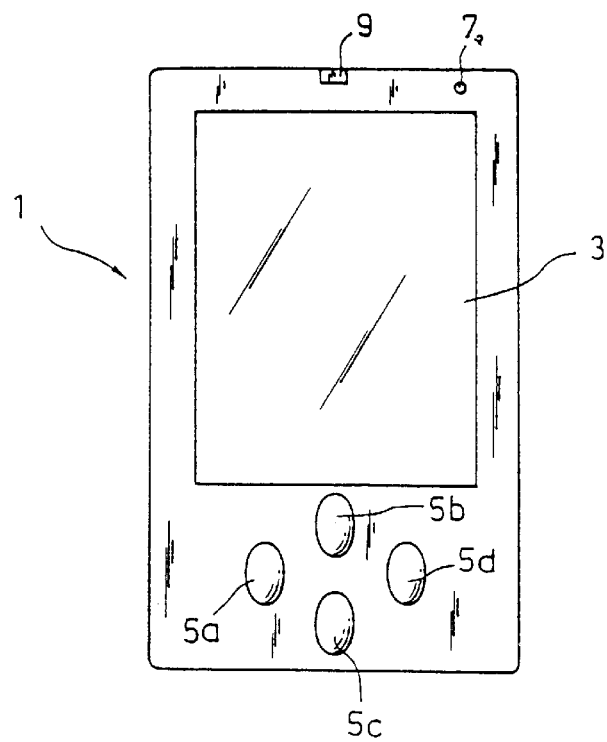
FIG. 1 is a cross-sectional view illustrating a light effect generating device according to a first embodiment of the present invention.
Figure 2:
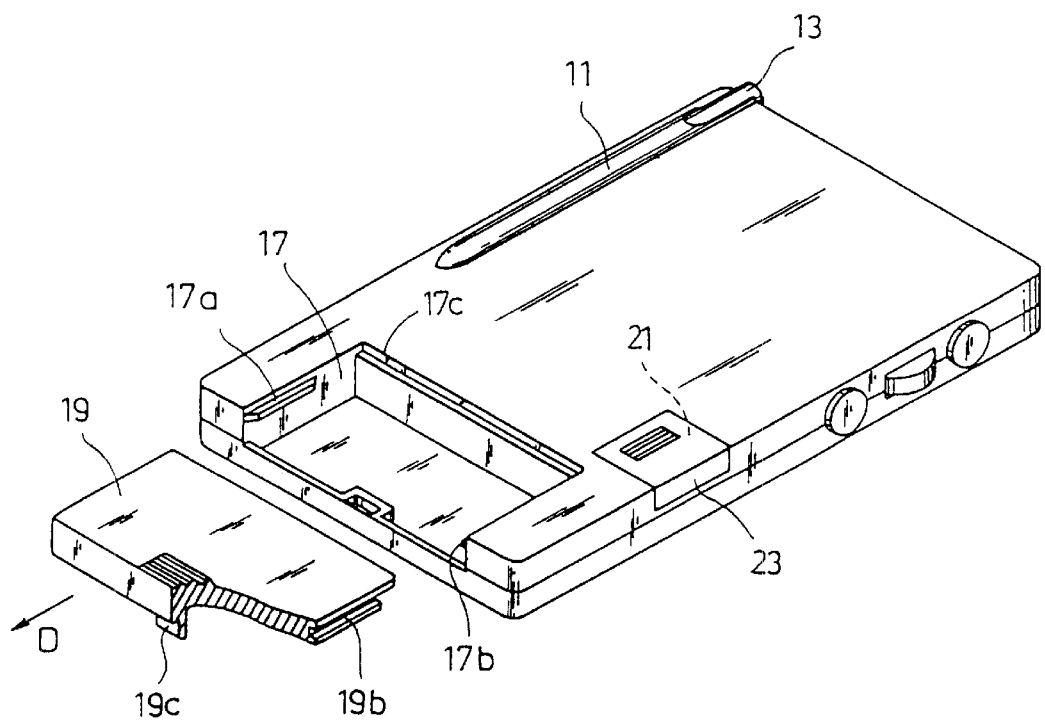
FIG. 2 is a partially cut-off top plane view of the light effect generating device shown in FIG. 1.
Figure 3:
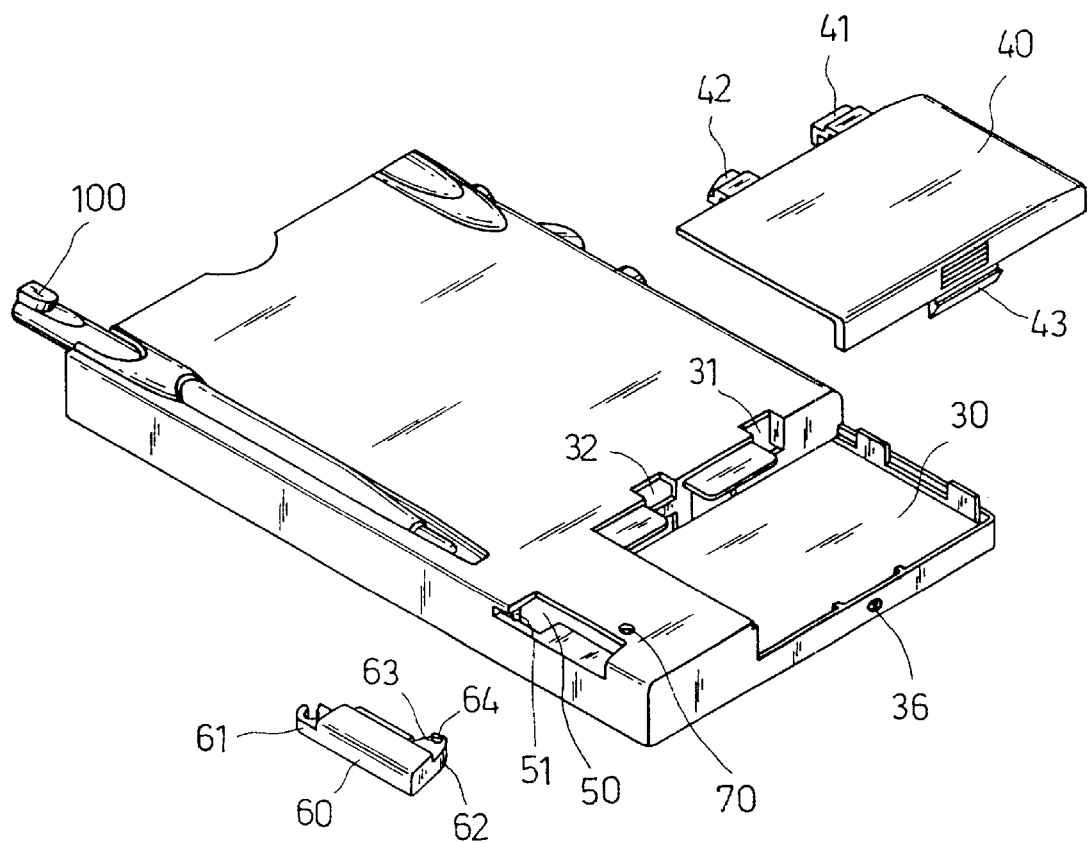
FIG. 3 is a partial cross-sectional, perspective view illustrating a lighting fixture according to a second embodiment of the present invention.
Figure 4:
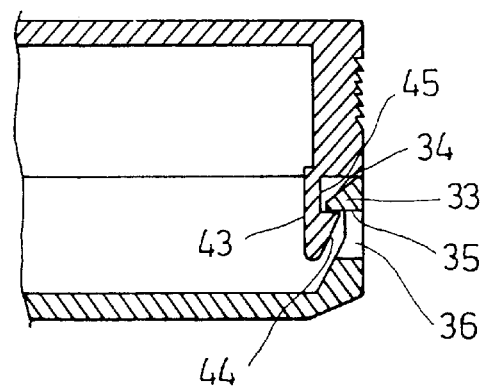
FIG. 4 is a partial cross-sectional, perspective view illustrating a lighting fixture according to a third embodiment of the present invention.

Referring to FIGS. 3 and 4, a primary battery compartment 30 and a battery compartment cap 40 according to the first aspect of the present application are illustrated. The primary battery compartment 30 is formed in a rear side of a pocket personal computer. The primary battery compartment 30 has two positioning openings 31, 32 formed in a rear side wall thereof and a bulge 33 inwardly formed on an inner face of a front side wall of the compartment 30. The bulge 33 has a slanted upper face 34 and a flat lower face 35. A through hole 36 is formed in the front side wall at a position that the through hole penetrates a portion of the lower slanted face 35. The through hole 36 is sized such that a tip end of a pen 100 of the pocket personal computer may be inserted therethrough.

The cap 40 is shaped to cover the compartment 30 and has two positioning protruding 41, 42 formed at a rear end thereof which are arranged such that when the cap 40 is placed over the compartment 30 the positioning protruding 41, 42 may be received in the openings 31, 32. The cap further has a latch 43 downwardly formed at a front end thereof. The latch 43 has a slanted lower end 44 and a depressed neck portion 45. When the cap 40 is placed over the compartment 30 and the front end of the cap 40 is pressed downward, the latch 43 may engage with the bulge 33 to lock the cap 40 in position and securely enclose the compartment 30, as seen in FIG. 3. While opening the compartment 30, the latch 43 is pushed backward by the tip end of the pen 100 to release the neck portion 45 of the latch 43 from the bulge 33 and thus unlock the cap 40 form front end of the compartment 30.

Also referring to FIGS. 3 and 4, a secondary battery compartment 50 and a battery compartment cap 60 according to a second aspect of the present application are illustrated. The battery compartment 50 has an vertical axis 51 formed at one short side thereof . A through hole 70 is formed in the rear face of the pocket personal computer at a position near the rear side of the compartment 50 and close to another short side of the compartment 50 which is opposite to the short side formed with the axis 51. The cap 60 is shaped to enclose the compartment 50 and has a hook shaped connecting arm 61 formed at one end thereof for pivotally connecting to the axis 51 and a latch 62 rearwardly formed at a rear side thereof in a position remote from the connecting arm 61. By way of the this arrangement, the secondary battery compartment cap 60 can be installed by connecting the arm 61 to the axis 51 and removed by disconnecting the arm 61 and the axis 51 directly form outside of the pocket personal computer, which is contrast to installing/removing a traditional secondary battery compartment cap that have to disassemble the entire casing of the pocket personal computer. The latch 62 has a peg 63 vertically protruding upward from an upper face thereof and the peg 63 has a rearward slanted upper face 64 such that when the cap 60 is rotated from an opened position to a closed position the peg 63 may be received in the through hole 70 to lock the cap 60 in position to prevent it from being accidentally opened. While opening the compartment 50, the peg 63 is pushed out of the through hole 70 by the tip end of the pen 100 and at the same time the cap 60 is pushed forward to pivot because of forward component of the force applied by the pen onto the rearward slanted upper face 64. The cap 60 is thus unlocked and free to be rotated form the closed position to the opened position.

This invention has been disclosed in terms of certain embodiments. It will be apparent that many modifications can be made to the disclosed structures without departing from the invention. Therefore, it is the intent of the appended claims to cover all such variations and modifications as come within the true sprit and scope of this invention.

What is claimed is:

1. In a pocket personal computer having a pen, a battery compartment defined in a rear side of the pocket personal computer and a battery compartment cap, the battery compartment comprising a first positioning means provided at a first side wall of the compartment, a first locking means provided at a second side wall of the compartment which is opposite to the first side wall, and an unlocking means provided at the second side wall; and the battery compartment cap comprising a second positioning means provided at a rear end thereof to removably engage with the first position means and a second locking means provided at a front end thereof to cooperate with the first locking means so as to lock the battery compartment cap in a position of enclosing the battery compartment, wherein the unlocking means can be operated by the pen to release the second locking means from the first locking means.

2. A pocket personal computer as claimed in claim 1, wherein he first positioning means comprises at least one openings and the second positioning means comprises at least one protrusions which can be received in the openings as the cap is positioned over the compartment.

3. A pocket personal computer as claimed in claim 1, wherein the first locking means comprises a bulge inwardly formed on an inner face of the second side wall and the bulge has a slanted upper face and a flat lower face.

4. A pocket personal computer as claimed in claim 3, wherein the second locking means comprises a latch downwardly formed at the front end of the cap and the latch has a slanted lower end and a depressed neck portion to cooperate with the bulge of the first locking means.

5. A pocket personal computer as claimed in claim 1, wherein the unlocking means comprises a through hole formed in the second side wall of the compartment and arranged and sized such that a tip portion of the pen may extend therethrough to cause the second locking disengage from the first locking means.

6. In a pocket personal computer having a pen, a battery compartment defined in a rear side of the pocket personal computer and a battery compartment cap, the battery compartment comprising an axis formed at one side of the compartment;

the battery compartment cap comprising a connecting means formed at a first end thereof for pivotally connecting to the axis and a first locking means formed at a second end thereof which is opposite to the first end; and a second locking means arranged at a position of the rear face of the pocket personal computer such that when the cap is pivoted to a position enclosing the compartment an engagement between the first and the second locking means can lock the cap in position and shaped such that the locking engagement may be disengaged by the pen.

7. A pocket personal computer as claimed in claim 6, wherein the connecting means comprises a connecting arm in a form of a hook for pivotally connecting to the axis and the battery compartment cap thus can be rotated from an opened position to a closed position.

8. A pocket personal computer as claimed in claim 6, wherein the first locking means comprises a latch extending from a second end of the battery compartment cap and the latch has a peg vertically protruding upward from an upper face thereof and the peg has a rearward slanted upper face.

9. A pocket personal computer as claimed in claim 6, wherein the second locking means comprises a through hole defined in the rear face of the pocket personal computer which can receive the peg while the battery compartment cap is rotated to the closed position so as to lock the battery compartment cap in position and enclose the battery compartment.

* * * * *